(12) United States Patent
Pousti et al.

(10) Patent No.: US 8,060,570 B2
(45) Date of Patent: Nov. 15, 2011

(54) SYSTEMS AND METHODS FOR SENDING AND RECEIVING E-MAIL ON A NETWORK COMMUNITY PLATFORM

(75) Inventors: Michael Pousti, San Diego, CA (US); Andrew Ballester, San Diego, CA (US)

(73) Assignee: SMS, ac, Inc., San Diego, CA (US)

( * ) Notice: Subject to any disclaimer, the term of this patent is extended or adjusted under 35 U.S.C. 154(b) by 51 days.

(21) Appl. No.: 12/404,179

(22) Filed: Mar. 13, 2009

(65) Prior Publication Data
US 2009/0287785 A1 Nov. 19, 2009

Related U.S. Application Data

(60) Provisional application No. 61/036,428, filed on Mar. 13, 2008.

(51) Int. Cl.
*G06F 15/16* (2006.01)
(52) U.S. Cl. .................................... 709/206; 709/203

(58) Field of Classification Search .................. 709/203, 709/206
See application file for complete search history.

(56) References Cited

U.S. PATENT DOCUMENTS

| | | | |
|---|---|---|---|
| 2004/0181683 A1* | 9/2004 | Jia et al. | 713/200 |
| 2006/0005207 A1* | 1/2006 | Louch et al. | 719/328 |
| 2008/0182563 A1* | 7/2008 | Wugofski et al. | 455/414.2 |

* cited by examiner

*Primary Examiner* — David Lazaro
(74) *Attorney, Agent, or Firm* — Procopio Cory Hargreaves & Savitch LLP; Noel C. Gillespie (57) ABSTRACT

A network platform for supporting a network-enabled application, comprising a plurality of communication channels to respective plurality of wireless network carries, each of the wireless network carriers having a plurality of users, the network platform comprises at least one processor, at least one interface having access to the internet, a mobile desktop applications, at least one email application, an address book widget, a private view widget, a fake public view profile, and a real public profile.

20 Claims, 6 Drawing Sheets

SYSTEMS AND METHODS FOR SENDING AND RECEIVING E-MAIL ON A NETWORK COMMUNITY PLATFORM

RELATED APPLICATION INFORMATION

This Application claims priority under 35 U.S.C. 119(e) to U.S. Provisional Patent Application 61/036,428, filed Mar. 13, 2008, and entitled "Systems and Methods for Sending and Receiving E-Mail on a Network Community Platform," which is incorporated herein by reference as if set forth in full.

This application is also related to Co-Pending U.S. patent application Ser. No. 11/743,040, filed May 1, 2007, and entitled "Systems and Methods for a Community-Based User Interface," Co-Pending U.S. patent application Ser. No. 11/516,921, filed Sep. 6, 2006, and entitled "Automated Billing and Distribution Platform for Application Providers," both of which are incorporated herein by reference as if set forth in full. This application is also related to U.S. Provisional Application Ser. No. 61/036,430, filed Mar. 13, 2008 and entitled "Mobile Network Community Desktop API," U.S. patent application Ser. No. 12/056,090, filed Mar. 26, 2008, and entitled "Systems and Methods for a Mobile, Community-Based User Interface," U.S. Provisional Patent Application Ser. No. 60/956,626, filed Aug. 1, 2007, and entitled "Systems and Methods for a Mobile, Community-Based User Interface," each of which is incorporated herein by reference as if set forth in full.

BACKGROUND

I. Field

The embodiments described herein relate to a network community platform, and, more particularly, relate to allowing users of the platform to send and receive e-mail communications from other users of the platform and users outside of the platform.

II. Background

The ubiquity of the Internet, e-mail access, and cellular telephones have created an environment in which users can be in communications with friends and family at nearly all times. Accordingly, a number of services and service providers now provide users with virtual communities in which people are allocated virtual spaces which they can personalize and customize. Within such communities of personal spaces, users having similar interests or some other connection or bond can congregate and socialize or share information and other news.

Because users rely on such virtual communities to socialize and communicate with other people, the usefulness and desirability of such communities is enhanced when as many of a user's friends and family as possible are part of or connected with the virtual community. Thus, there is a need for a user of a virtual community and other, similar services to be able to send e-mail to and receive e-mail from their friends and families within the virtual community and outside of it.

SUMMARY

A network platform for supporting a network-enabled application, comprising a plurality of communication channels to respective plurality of wireless network carries, each of the wireless network carriers having a plurality of users, the network platform comprises at least one processor, at least one interface having access to the internet, a mobile desktop applications, at least one email application, an address book widget, a private view widget, a fake public view profile, and a real public profile.

These and other features, aspects, and embodiments of the invention are described below in the section entitled "Detailed Description."

BRIEF DESCRIPTION OF THE DRAWINGS

For a more complete understanding of the principles disclosed herein, and the advantages thereof, reference is now made to the following descriptions taken in conjunction with the accompanying drawings, in which.

Appendices A, B, C and D include a multitude of drawings, tables, and descriptions which provide details and further understanding of the various embodiments of the present invention. The disclosures of these appendices are incorporated herein by reference.

DETAILED DESCRIPTION

Figure 2:
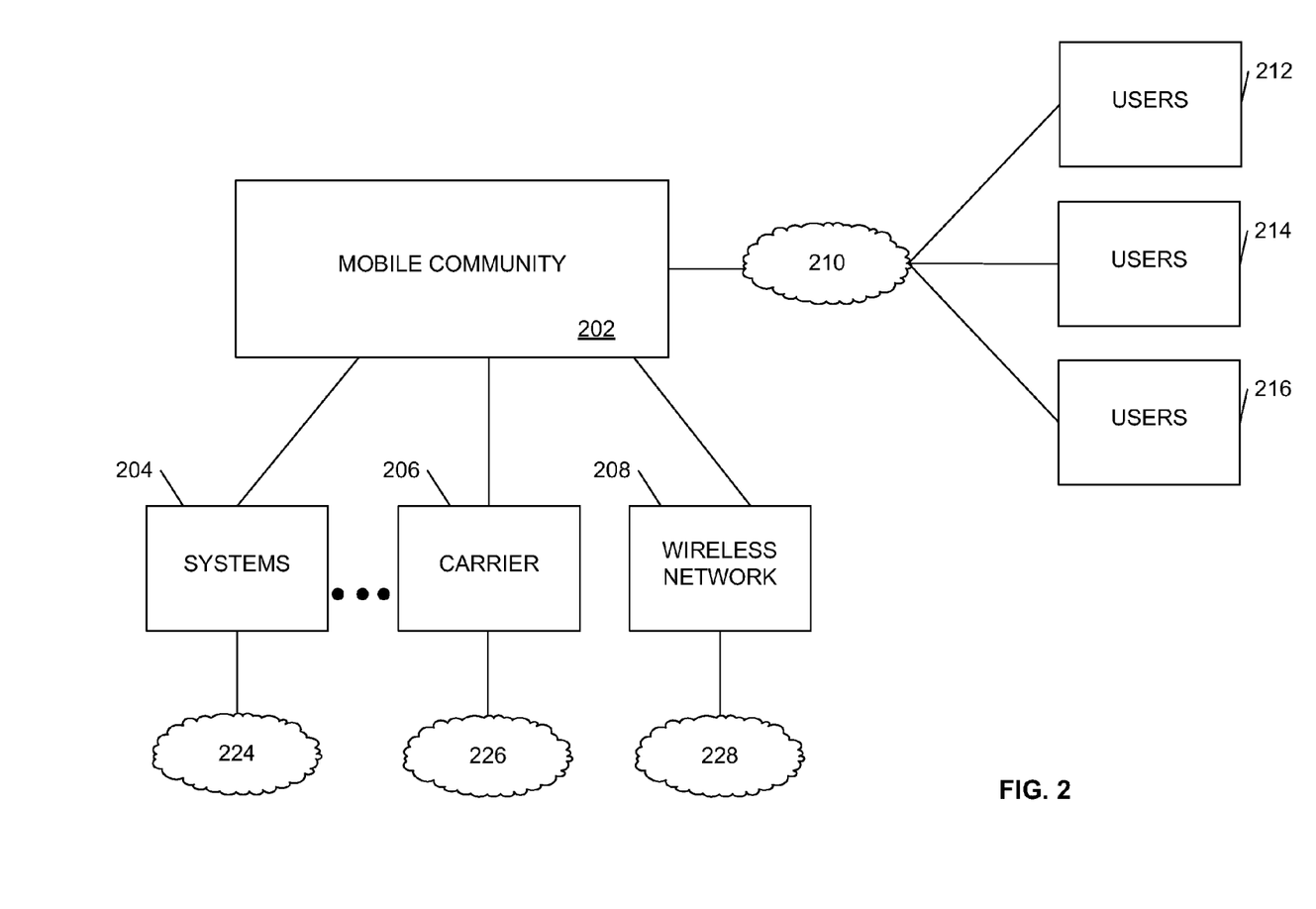
FIG. 2 depicts a block diagram of a computer-based virtual community, in accordance with one embodiment.

FIG. 2 depicts a block diagram of a computer-based virtual mobile community 202. Only a brief summary of the details of the mobile community 202 is provided below. The full details of this community and system are described in U.S. Patent Application Ser. No. 60/714,978, filed on Sep. 7, 2005, the disclosure of which is incorporated herein in its entirety. Users 212, 214, 216 can connect to the mobile community 202 via a network or similar communications channel 210. Via the connection, a user (e.g., 212) may create a profile page or "home page" that they can personalize. This profile page can include various files and content that the user wants to share with other members of the mobile community 202.

The profile page may include a hierarchy of pages, some of which are for public view and some of which have restrictions on viewing. For example, the mobile community 202 can be logically organized into neighborhoods such as "friends", "family", "workplace", "dog owners", etc. Users 212, 214, 216 can belong to these different neighborhoods and share different pages with the members of the different neighborhoods.

Additionally, this mobile community connects with various cellular carrier systems 204, 206, 208, each of which has an associated community of mobile phone subscribers, 224, 226 and 228. Users 212, 214, 216 of the mobile community 202 are also subscribers of various cellular carriers. In this way, users 212, 214, 216 of the mobile community 202 not only have access through the computer-based platform 202 to other users' profile pages, they also have easy access to subscribers of the various cellular' carrier systems 204, 206, 208.

A benefit of the architecture depicted in FIG. 2, is that the mobile community platform 202 has already contracted for services with the cellular carrier systems 204, 206, 208. As is known in the art, the cellular carrier systems 204, 206, 208 provide messaging and premium message functionality. Such messages are sent via the cellular carrier's infrastructure to mobile subscribers and, internal to the cellular carrier's infrastructure, generates a billing event according to a particular tariff rate. In practice, when the mobile community 202 sends a message via a cellular carrier system (e.g., 204), it is billing the recipient of the message using the existing billing system of that cellular carrier. The billing event is often a microtransaction. Thus, a user (e.g., 212) of the mobile community may conduct transactions with a vendor within the mobile community 202 and be billed for those transactions via their cellular service account. The vendor in the transaction need only communicate with the mobile community 202 regarding the transaction and does not require any affiliation or agreement with any cellular carrier.

Figure 3:
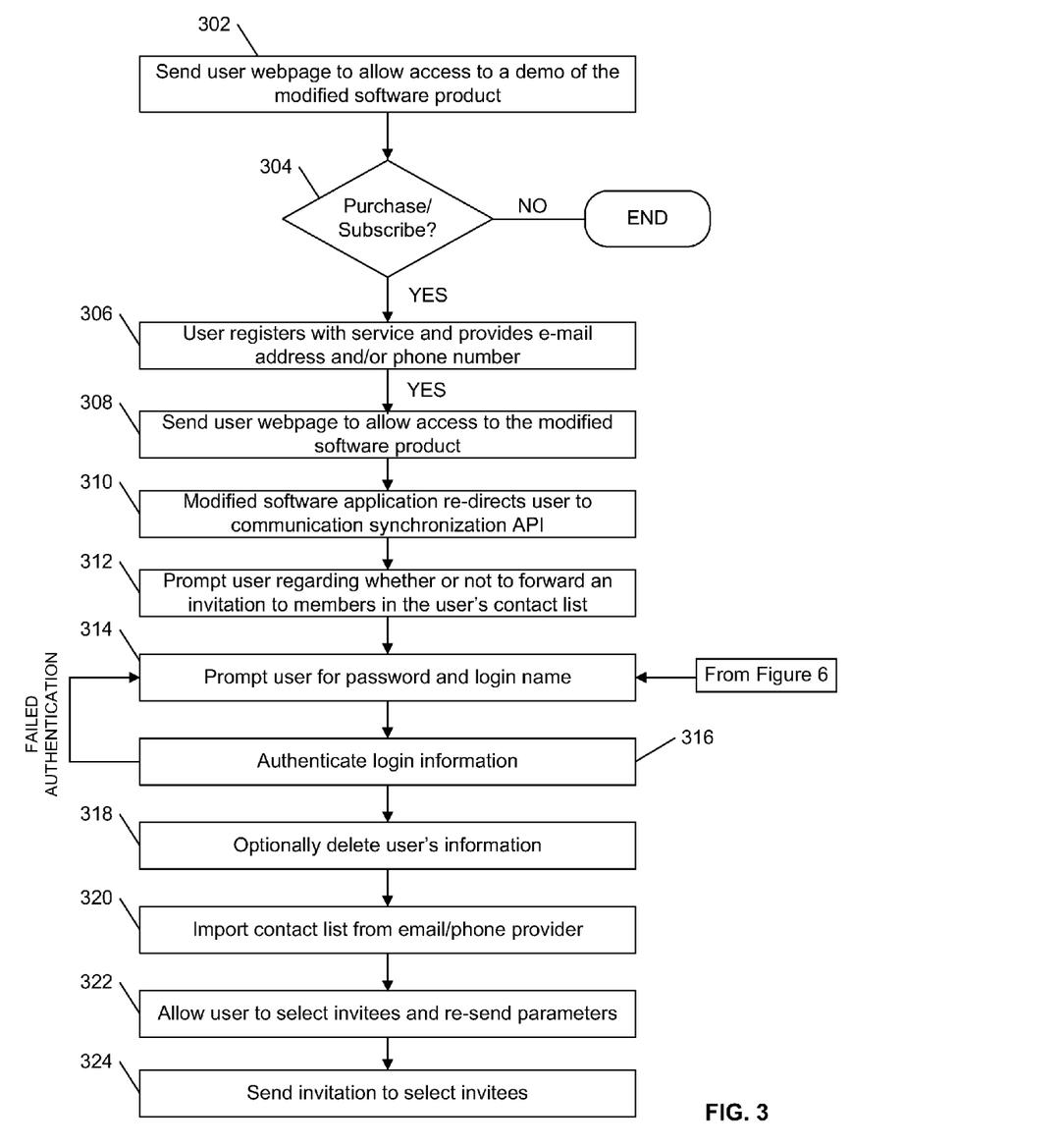
FIG. 3 depicts a flowchart of an exemplary method for allowing users to invite other members into the community, in accordance with one embodiment.

The experience of the user (e.g., 212) within the mobile community 202 will be more enjoyable then there are more members of the mobile community 202 with which the user (e.g., 212) would like to communicate. Accordingly, embodiments of the present invention provide techniques that help ensure that people already familiar to the user (e.g., 212) are invited to become members of the mobile community 212. FIG. 3 depicts a flowchart of an exemplary method that operates in accordance with the principles described in various embodiments of the present invention. The steps of the flowchart of FIG. 3 are described below within the context of a specific example involving the mobile community of FIG. 2. However, there is no requirement that the steps be used in this specific environment but, instead, can be used by other types of service providers to assist a user in inviting other members to join a particular service.

Figure 4:
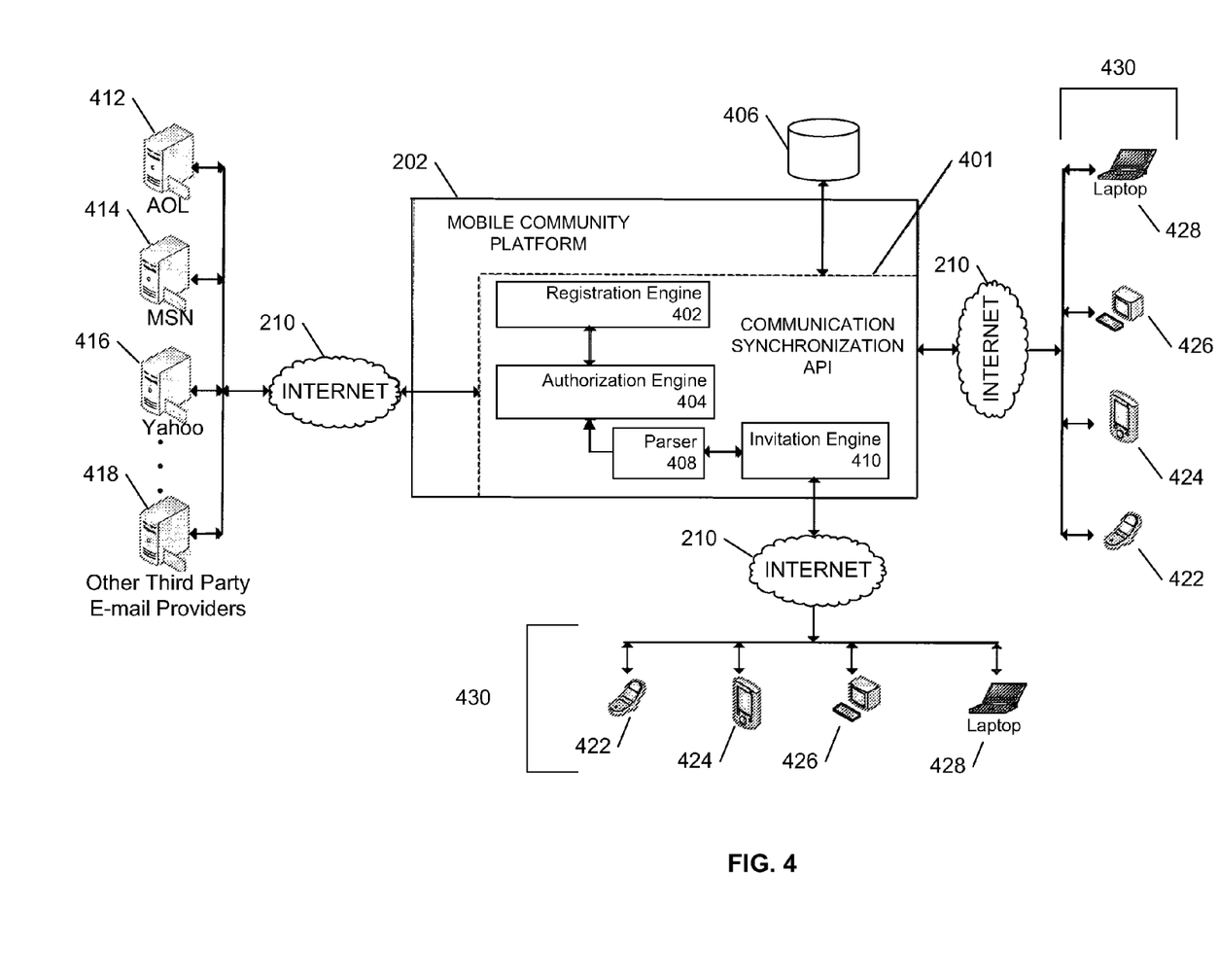
FIG. 4 depicts a functional block diagram of a system for performing the exemplary method of FIG. 3.

To aid in the understanding of the flowchart of FIG. 3, FIG. 4 is provided with a more detailed view of those aspects of the mobile community 202 that are directly relevant to understanding the flowchart of FIG. 3. As depicted in FIG. 4, the mobile community 202 includes a communication synchronization application programming interface (API) 401. The communication synchronization API 401 is comprised of a registration engine 402, an authorization engine 404, a parser 408 and an invitation engine 410. In particular, the registration engine 402 is configured to handle the presentation of screens to new users during the registration process and also receives replies and responses from the registering users.

Users 430 may utilize a variety of different types of devices to interface with the mobile community 202. Examples of the types of devices that may be used include, but not limited to, laptop PCs 428, desktop PCs 426, mobile phones 422, PDAs 424, etc. In one embodiment, when a new user 430 arrives at mobile community 202, the user may interact (e.g., view, utilize, evaluate, rate, etc.) a plurality of different third-party software applications that are registered to the mobile community 202. For example, in step 302 a user may request access to a demo version of a third-party software application from mobile community 202; which results in the mobile community 202 sending a webpage conferring access to the user. After interacting with the demo, the new user chooses whether to purchase (or subscribe) a "full" version of the third-party software application in step 304. If the new user decides to purchase the full version of the third-party software application, the user may be required to first register with the mobile community 202 in step 306. In another embodiment, when a new user arrives at the mobile community 202, the user is immediately directed to step 306 where a registration screen may be presented to the user prompting the user to enter a variety of identifying information. For example, in step 306, the registration process results in the user providing an e-mail address and/or a mobile telephone number to the mobile community 202.

In step 308, after providing an e-mail address and/or a mobile telephone number to register with the mobile community 202, the user is presented with a webpage (sent by mobile community 202) that gives the user access to a full version of the third-party software application.

Continuing on to step 310, when the user interacts with the full version of the third-party software application, the user is re-directed to the communication synchronization API 401. That is the third-party software application can be been modified (as described in FIG. 5) by the third-party software provider to include a script that automatically sends the user to the communication synchronization API 401 that is an integrated part of the mobile community 202. Moving on to step 312, the synchronization API 401 presents the user with an invitation screen that informs the user that if they desire, they can send an email message to all members of their contact list that invites those members to purchase/subscribe to the third-party software application that the user is also purchasing. The invitation screen prompts the user, in step 314, to enter their login information for the e-mail address (e.g., username and password). The user is informed that if they would like to send invitations, then they should fill out the login information. If, however, they do not want to send invitations, then they can leave the login information blank. Thus, the sending of invitations to the members of the contact list is completely at the discretion of the registering user and only takes place if the registering user so decides. Once, the user decides on a course of action, then a "Finish", "Next", or "Submit" button is selected to continue.

In step 316, the authorization engine 404 uses the provided login information to authenticate with the e-mail provider. This may entail simply logging into the e-mail provider's access area like a typical user or it may entail other techniques. For example, the e-mail provider may permit a variety of different authentication methods such that completing authentication of any one of them allows access into the e-mail system. One specific example would be a e-mail provider that provides not only e-mail service but also instant-messaging service. Thus, authenticating for either one of the services would allow access into the e-mail area. If authentication fails, then the user can be prompted to re-enter the login information in case a mistake was made and then authentication is retried.

It should be understood that the communication synchronization API 401 may be used in conjunction with a variety of different e-mail providers. For example, "hotmail.com" (MSN) 414, "yahoo.mail" 416 and AOL 412 are three e-mail provider (domains) that may be supported. Other supported e-mail providers 418 (domains) include, but are not limited to: 163.com, adelphia.net, bellsouth.net, BOL.com, btinternet.com, cantv.net, caramail.com, clubinternet.fr, comcast-.net, cox.net, cs.com, docomo.ne.jp, earthlink.net, email-.com, excite.com, free.fr, freenet.de, gmail.com, gmx.de, gmx.net, hanmail.net, hetnet.nl, home.nl, Hotmail, Hotmail country domains (UK, France, Germany and Italy), ibest-.com.br, ig.com.br, indiatimes.com, juno.com, latinmail-.com, libero.it, lycos.com, mail.com, mail.ru, MSN, mynet-.com, naver.com, netscape.net, netzero.net, ntlworld.com, pacific.net.sg, pandora.be, planet.nl, pop.com.br, prodigy-.net.mx, Rediff.com, rogers.com, sbcglobal.net, shaw.ca, Sina.com, singnet.com.sg, skynet.be, Sohu.com, sympatico.ca, terra.com.br, terra.es, tiscali.co.uk, tiscali.fr, tiscali.it, tiscalinet.it, Tom.com, t-online.de, uol.com.br, usa.net, verizon.net, voila.fr, wanadoo.fr, wanadoo.nl, web.de, xtra.co.nz, Yahoo, Yahoo country domains (China, Brazil, France, Canada, UK, India, Singapore and Malaysia), zipmail.com.br.

Once authentication is successfully completed, the authorization engine 404 has access to the user's e-mail account and its content. At this time, the authorization engine 404, in step 318, may delete the user's information so that a persistent copy of the username and password are not stored within the mobile community 202. This deletion is, however, an optional step. For example, retaining this information may be useful for other services such as periodically checking that e-mail account and forwarding messages from there to other e-mail accounts. Alternatively, the user's information may also be kept (at the user's request) so that the next time the user logs into the mobile community 202 the user will not have to re-enter the information.

Once the authorization engine 404 has access to the e-mail account of the user, then the authorization engine can retrieve the address book, or contact list, from the e-mail provider, in step 320. The specific manner in which a username and password are used to login into an e-mail provider and extract an address book depends on the specific implementation of the e-mail provider's system. One of ordinary skill will recognize that many functionally equivalent techniques may be used, as well, without departing from the scope of the present invention. Furthermore, if the e-mail provider and the mobile community explicitly partner for the purposes of facilitating this extraction of contact lists, then the e-mail provider may develop and publish a specific API for the mobile community system to use to easily extract the contact list.

Part of the process for importing a contact list or address book includes parsing the HTML page (imported from the e-mail provider) to extract just the e-mail addresses. The other extraneous characters and information need to be ignored so that the e-mail addresses within the contact list can be retrieved. The parser 408 is responsible for receiving the HTML page from the authorization engine 404 and extracting just the e-mail addresses that are then forwarded to the invitation engine 410.

Once the addresses from the address book or contact list are forwarded to the invitation engine 410, the engine 410 can automatically send out a default invitation letter to all the people on the list inviting them, on behalf of the registering user, to join the mobile community 202. However, additional customization and selectivity at this point is advantageous. In particular, the invitation engine 410 can generate a screen that is presented to the user informing them of the addresses that were extracted from the address book or contact list. The registering user can then select or de-select certain addresses so that only a limited number of the addresses receive the invitation. Furthermore, the text of the invitation message can be presented in an editable window so that the registering user can customize and personalize the invitation letter.

Another available option includes the ability to re-send the invitation periodically. For example, if an invitee does not respond at all to the initial invitation, then a subsequent invitation can be re-sent. The registering user can select how often to re-send the invitation. For example, the registering user can elect to send no "re-sends", can elect to periodically send one every x months for a period of y months (where x and y are appropriate integer values that the user can specify). Thus, in step 322, the registering user can customize the invitation process by selecting on certain e-mail address to receive an invitation and also personalizing the actual invitation as well as the re-send parameters.

In step 324, the invitation engine 410 sends the invitations according to the parameters selected in step 324. The e-mail addresses along with the re-send meta-data for each address is stored in the database 406. Thus, periodically, the invitation engine 410 reviews the information in the database 406 and determines when a re-send invitation is scheduled. Once the invitations are sent, then the registration engine 402 continues with the registration process in step 320. If desired, the actual sending of the invitations, in step 324, can be delayed until the registering user fully completes the registration process.

There are a number of optional features that can be included within the flowchart of FIG. 3 to increase the efficiency and user-friendliness of the invitation process. For example, as part of the authentication process of step 316, the authorization server can determine if this e-mail address has previously been used to find and extract an address book. If so, then the authorization engine 404 can inform the user that invitations were recently sent to members of the address book and that additional invitations will not be re-sent. The determination whether or not to send invitations to members of the address book can be based on how recently (e.g., within the last n hours) the address book was extracted.

Another option is to avoid sending invitations to addresses that were already imported from someone else's address book. Thus, when the registering user is presented with the list of potential invitees in step 322, no e-mail addresses will be presented that have already been stored in the database 406 from previously extracted phone books. However, when an invitation is re-sent at some later time, the re-sent invitation includes the names of all registering members (not just the first) that is issuing the invitation. Thus, the recipient of the re-sent invitation knows on whose behalf the invitation was sent.

In some instances, some of the extracted e-mail addresses will correspond to individuals who are already members of the mobile community 202. In these instances, there is no need to send an invitation to these addresses. It may be advantageous, however, to inform the registering member of the identity of these current members so that the registering member knows to look for these current members within the mobile community 202. This can be done by displaying a picture of the current members along with their name and other contact information. Alternatively, the current member can specify what graphic image or other data to display in such an instance.

In the previous examples, the specific address books and contact lists described were related to e-mail addresses. However, many mobile phones also include contact lists that have phone numbers and e-mail addresses. Thus, in addition to asking the registering user whether or not they want to send invitations to the people in their e-mail address books, they can be asked whether or not they want invitations sent to addresses in their mobile phone. To get access to the mobile device's address book, the device's user typically has to initiate the transfer of the address book to a third party. Thus, instead of authenticating to an e-mail server and downloading an address book, the authorization engine would send a text message to the registering user's mobile device asking them to respond by initiating a transfer of the address book. Once the authorization engine 402 has the address book, the parser can extract the addresses as before.

Furthermore, in the above examples, the synchronization of address books has been described as part of the registration process with the service provider. The flowchart of FIG. 6, in contrast, depicts an exemplary method which allows an already registered user to send invitations to addresses in their address book. In accordance with this method, the user logs into their account with the network community platform (e.g., sms.ac) in step 602. Once the user is logged in then they are presented with their home page in step 604.

Figure 6:
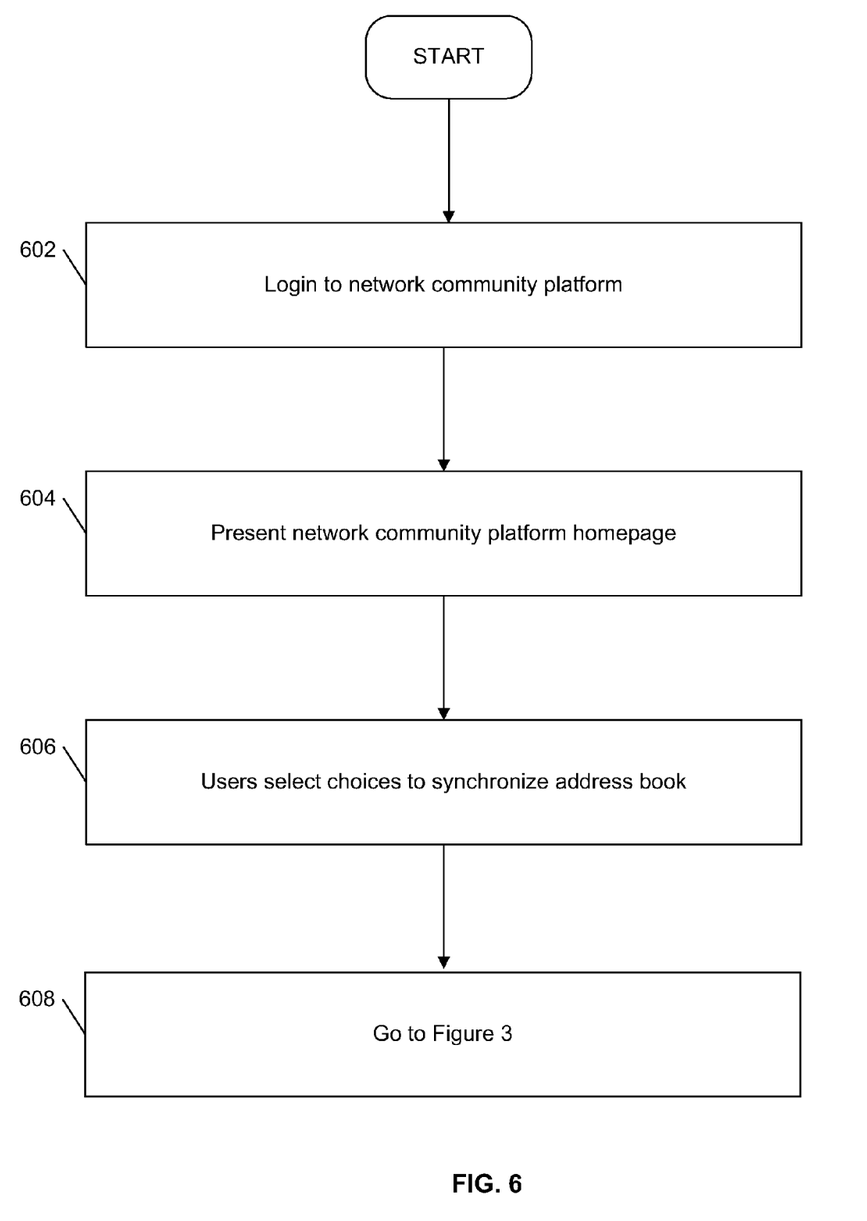
FIG. 6 depicts a flowchart of an exemplary method of allowing already registered users to send invitations to members of their address book, in accordance with one embodiment.

From their home page, the user can traverse the available selections and links, in step 606, to arrive at a screen that allows them to make a selection to synchronize their address book. Once this choice is made, then the process described in FIG. 3 is performed starting at step 314.

Although not mentioned earlier, yet applicable to both applications, the user may provide more than one supported e-mail address having an associated address book. In this case, the system will authenticate multiple e-mail addresses and passwords and import multiple address books. The addresses from all the address books will be combined into a single invitation list.

The re-sending of invitations may be handled as a manual process as well. Because the user originally went through the synchronization process during the original registration process, the addresses from their e-mail address book are also in their current address book within the mobile community 202. Thus, when the user visits their address book (or possibly some other page) they may be given the option to re-send invitations to those individuals that they realize did not respond to the first invitation to join the community. In operation, a list of all members in their address book can be displayed so that the user can select some, de-select some, select "all", thereby identifying those addresses to which invitations should be re-sent. This feature supplements the original sending of invitations and requested re-sends which the user requested at the time of registration. Because the mobile community 202 retains information regarding previous invitations, it may choose to omit displaying addresses that relate to current members or addresses who have asked not to receive additional invitations. Thus, the user may not be given the choice to re-send invitations to such addresses.

Figure 5:
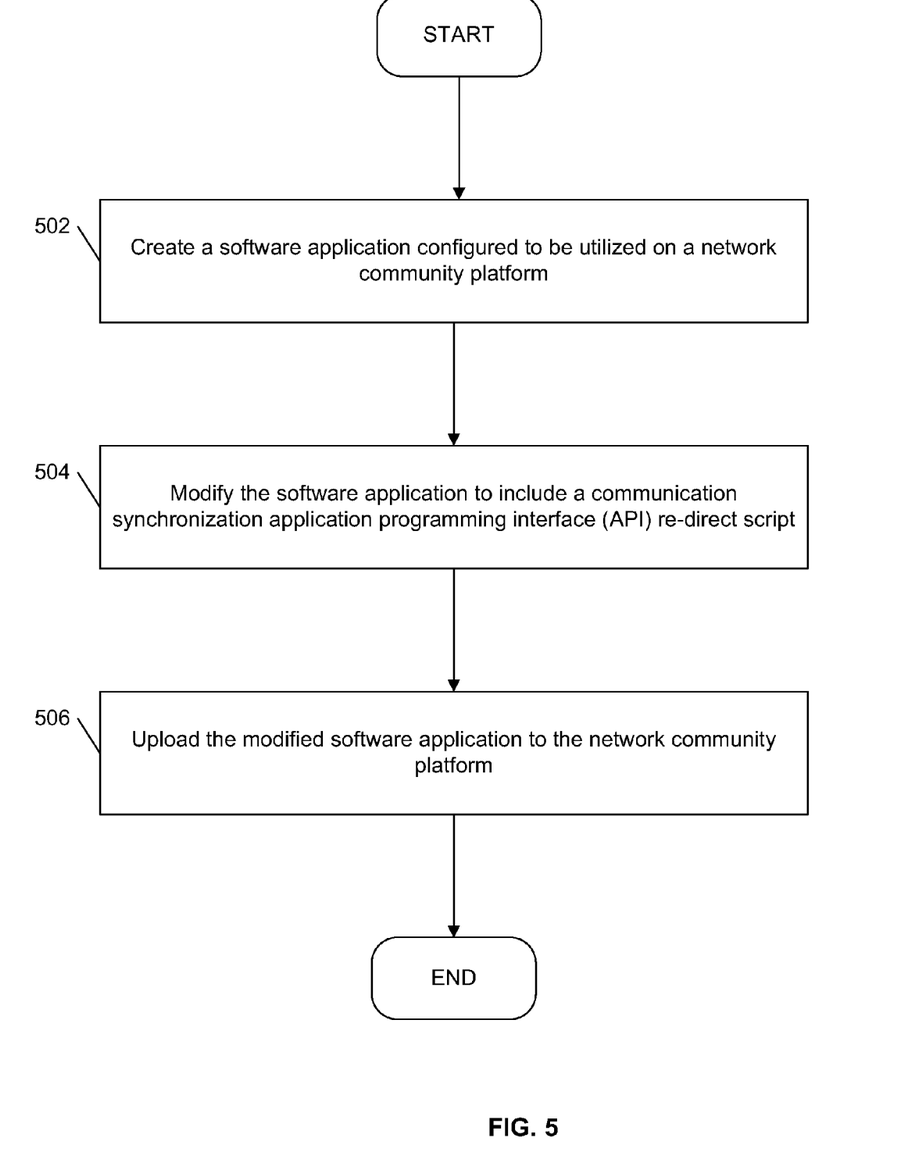
FIG. 5 is a flowchart illustrating an example process for creating a communication synchronization capable third-party software application to the mobile community, in accordance with one embodiment.

FIG. 5 is a flowchart illustrating an example process for creating a communication synchronization capable third-party software application to the mobile community, in accordance with one embodiment. As used herein, a third-party software developer is any software provider that is a registered with the mobile community 202 as a content provider. In step 502, the third-party software developer creates a software application that is configured to be utilized on a network community platform (mobile community 202). For example, the application may be optionally created in FLASH, JAVA, HTML or JAVASCRIPT. It should be understood, however, that the application may be created using any programming language as long as the resulting application is compatible with the community platform. Moving on to step 504, the software application is modified to include a re-direct script to the communication synchronization application programming interface (API). That is, the software application is implanted with script that is configured to re-direct a user to mobile community's 202 communication synchronization API when the user interacts with the software application. Continuing on to step 506, the modified software application is uploaded to the mobile community 202 where existing and prospective members of the mobile community 202 can purchase or subscribe to use the application.

At least portions of the invention are intended to be implemented on or over a network such as the Internet. An example of such a network is described in FIG. 1. The description of the network and computer-based platforms that follows is exemplary. However, it should be clearly understood that the present invention may be practiced without the specific details described herein. Well known structures and devices are shown in block diagram form in order to avoid unnecessarily obscuring the present invention.

Figure 1:
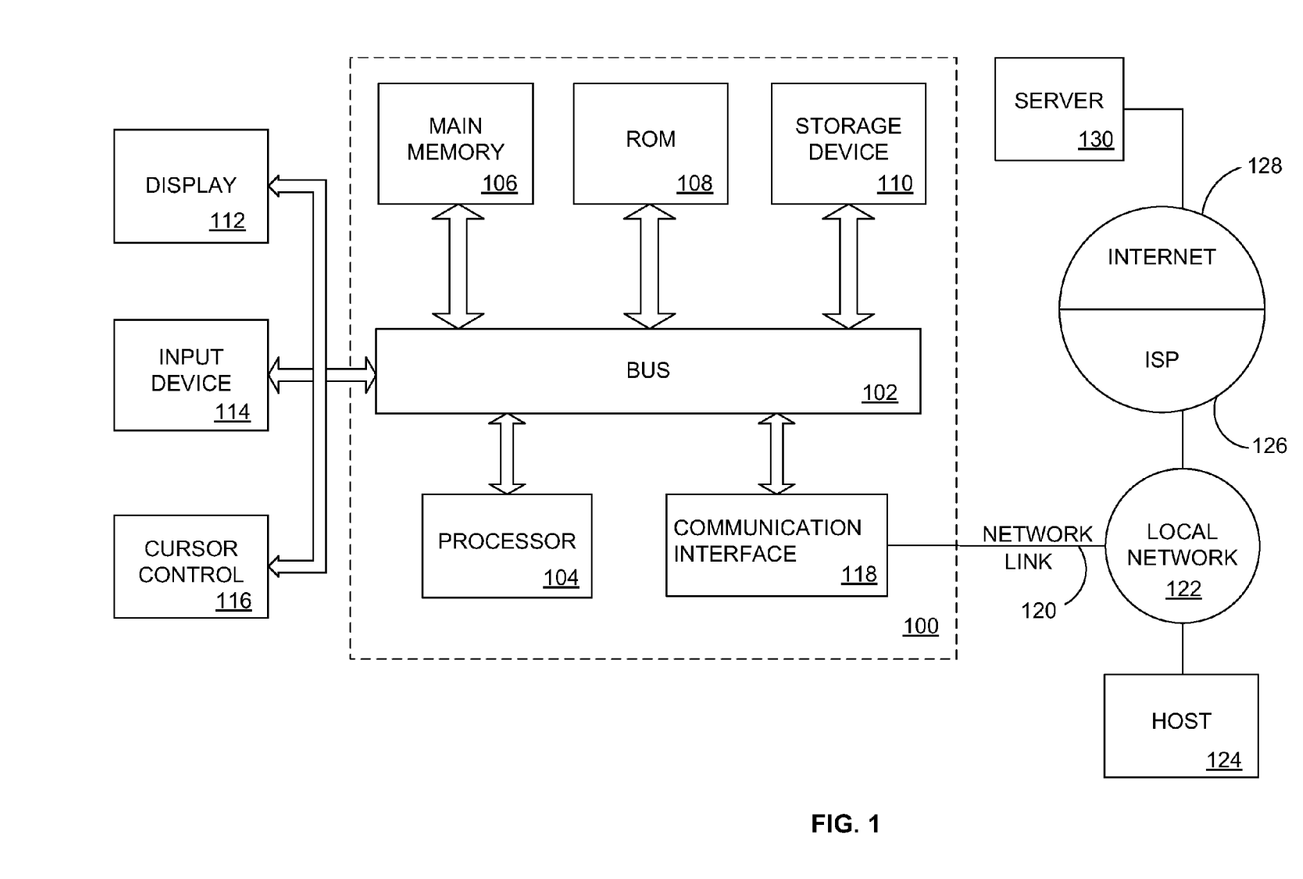
FIG. 1 depicts a block diagram of a computer platform on which embodiments of the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 operates in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments described herein are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

The embodiments described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Further description and illustration of the various embodiments of the invention described herein are provided in Appendices A, B, C and D which are attached hereto and incorporated herein by reference as if set forth in full.

Appendix A is a concept criteria document that describes the implementation of the various embodiments of a system and method for sending and receiving e-mail communications on a mobile network community platform. As described within the document, the system will include components and features such as a sync update and pre-populated address book widget, a private view address book widget, a fake public profile for mobile network community platform users to e-mail external non-users, a real public profile for mobile network community platform users to e-mail other users, a sender in Mailer/e-mail template, functionality to allow users to create mobile network community platform (i.e., FanBox) e-mail/unique universal resource locator (URL) updates, functionality to receive e-mail from external e-mail accounts, and functionality to create a block list for unique URLs.

Appendix B is a series of concept screenshots that illustrate the various components and features that are described in Appendix A.

Appendix C is a concept criteria document that describes the implementation of the various embodiments of a system and method for stripping all attachments sent to a user's network community platform (i.e., FanBox) email account placing them into the mobile network community platform desktop for storage. The user can then access the attachments via links (replacing the stripped attachments) in the e-mail. When the user clicks on the link, the file can open within the user's mobile network community platform desktop without having to download the file onto the user's PC.

Appendix D is a series of concept screenshots that illustrate the various components and features that are described in Appendix C.

Any of the operations that form part of the embodiments described herein are useful machine operations. The invention also relates to a device or an apparatus for performing these operations. The systems and methods described herein can be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed:

1. A network platform for supporting a network-enabled application, comprising a plurality of communication channels to respective plurality of wireless network carries, each of the wireless network carriers having a plurality of users, the network platform comprising;
   at least one processor;
   at least one interface having access to the internet;
   a mobile desktop applications;
   at least one email application;
   an address book widget;
   a private view widget;
   a fake public profile for a contact of a user that is not a user of the network platform, the fake public profile being viewable by the user via the at least one email application, the fake public profile comprising real contact information for the contact; and
   a real public profile for a contact of the user that is a user of the network platform, the real public profile being viewable by the user via the at least one email application.

2. A computer implemented method of providing information to a user of a social networking site, comprising:
   establishing, on the social networking site, a user profile web page associated with each of a plurality of users;
   receiving an account credential from one of the plurality of users for accessing an address book that is stored on a server separate from the social networking site;
   retrieving, from the separate server, contact information for one or more contacts of the user using the account credential;
   storing the contact information for the one or more contacts in a local address book associated with the user on the social networking site;
   receiving a selection by the user of a contact from the local address book;
   determining whether the selected contact is a user of the social networking site; and
   providing a profile of the selected contact to the user, wherein,
      if the selected contact is a user, the profile is a real profile based on a public portion of the profile web page associated with the contact, and
      if the selected contact is not a user, the profile is a fake profile based on real contact information from the local address book associated with the contact.

3. The method of claim 2, wherein the retrieved contact information comprises a picture.

4. The method of claim 2, wherein the profile comprises a picture.

5. The method of claim 4, wherein the profile is a fake profile and the picture is a stick figure when no picture is available in the contact information associated with the contact.

6. The method of claim 2, wherein the profile comprises a user area.

7. The method of claim 6, wherein the profile is a fake profile and the name is an email address when a name is not available in the contact information associated with the contact.

8. The method of claim 2, wherein the local address book is stored in a private portion of the profile web page associated with the user.

9. The method of claim 2 wherein the fake profile uses a default theme.

10. The method of claim 2, further comprising an application access step of making a plurality of network-enabled applications available, in the social networking site, to the plurality of users via an area on the social networking site and allowing each of the plurality of users the ability to place one of the plurality of network-enabled application on their web page and to access or use the network-enabled applications on the web-page.

11. A computer implemented method of providing information to a user of a social networking site, comprising:
  establishing, on the social networking site, a user profile web page and an address book associated with each of a plurality of users, the address book comprising contact information associated with one or more contacts of each respective user;
  receiving an email from a sender that is a contact of a user;
  determining whether the sender is a user of the social networking site; and
  providing a profile of the sender to the user, wherein,
    if the sender is a user, the profile is a real profile based on a public portion of the profile web page associated with the sender, and
    if the sender is not a user, the profile is a fake profile based on contact information from the local address book associated with the sender.

12. The method of claim 11 further comprising receiving a selection of the email by the user.

13. The method of claim 12 wherein providing the profile to the user is performed responsive to receiving the selection.

14. The method of claim 11, wherein the contact information comprises a picture.

15. The method of claim 11, wherein the profile comprises a picture.

16. The method of claim 15, wherein the profile is a fake profile and the picture is a stick figure when no picture is available in the contact information associated with the sender.

17. The method of claim 11, wherein the profile comprises a name.

18. The method of claim 17, wherein the profile is a fake profile and the name is an email address when a name is not available in the contact information associated with the sender.

19. The method of claim 11, wherein the address book is stored in a private portion of the profile web page associated with the user.

20. The method of claim 11 wherein the fake profile uses a default theme.

* * * * *